(12) United States Patent
Jessop

(10) Patent No.: US 12,052,986 B2
(45) Date of Patent: Aug. 6, 2024

(54) PORTABLE OXYGEN SOURCE WITH PERFUSION SYSTEM

(71) Applicant: Vascular Perfusion Solutions, Inc., San Antonio, TX (US)

(72) Inventor: Israel Jessop, Garden Ridge, TX (US)

(73) Assignee: Vascular Perfusion Solutions, Inc., San Antonio, TX (US)

( * ) Notice: Subject to any disclaimer, the term of this patent is extended or adjusted under 35 U.S.C. 154(b) by 185 days.

(21) Appl. No.: 17/305,472

(22) Filed: Jul. 8, 2021

(65) Prior Publication Data

US 2022/0007634 A1 Jan. 13, 2022

Related U.S. Application Data

(60) Provisional application No. 63/049,222, filed on Jul. 8, 2020.

(51) Int. Cl.
*A01N 1/02* (2006.01)
(52) U.S. Cl.
CPC ........... *A01N 1/0247* (2013.01); *A01N 1/021* (2013.01)

(58) Field of Classification Search
CPC .............................. A01N 1/0247; A01N 1/021
See application file for complete search history.

(56) References Cited

U.S. PATENT DOCUMENTS

| | | |
|---|---|---|
| 10,091,985 B2 | 10/2018 | Tempelman et al. |
| 2015/0342177 A1* | 12/2015 | Hassanein .............. C12M 29/10 |
| | | 435/284.1 |
| 2017/0013828 A1* | 1/2017 | Boucher .............. A01N 1/0247 |
| 2021/0038855 A1* | 2/2021 | Oddo .................... A61M 16/12 |

* cited by examiner

*Primary Examiner* — Robert M Kelly
*Assistant Examiner* — Eric J Rogers
(74) *Attorney, Agent, or Firm* — Schwegman, Lundberg & Woessner, P.A.

(57) ABSTRACT

The present disclosure includes a system to preserve tissue and associated methods. The system can include a portable oxygen source to provide oxygen and apply a pressure gradient to a flow of the oxygen, an organ preservation system having an inlet to fluidly couple to vasculature of the tissue, and an oxygen line to fluidly couple the portable oxygen source to the organ preservation system at the inlet, wherein the portable oxygen source is to apply the pressure gradient to pump fluid containing the oxygen through the organ preservation system.

19 Claims, 3 Drawing Sheets

PORTABLE OXYGEN SOURCE WITH PERFUSION SYSTEM

CROSS-REFERENCE TO RELATED APPLICATION

This application claims the benefit of priority to U.S. Provisional Patent Application Ser. No. 63/049,222 filed Jul. 8, 2020, the contents of which are incorporated herein by reference in their entirety.

BACKGROUND

Perfusion includes the passage of fluid through the circulatory system or lymphatic system of an organ or tissue. In the human body, perfusion often refers to passage of blood through a capillary bed in tissue. Perfusion can allow for the delivery of oxygen, other dissolved gases, nutrients, and other items to the tissue. When tissue or an organ is not residing in the body, such as during transport of an organ for transplant, perfusion does not naturally occur.

SUMMARY

Disclosed herein are a system and associated methods for preservation of tissue using a portable oxygen source. The system can pump fluid and oxygenate that fluid for tissue preservation by perfusion. The system herein uses compressed, oxygen-rich gas from a portable oxygen source as both an oxygen supply and a source of pressure to pump fluid through the tissue vasculature. This can reduce or eliminate the need for additional electrical and mechanical components.

In an example, a system can include a portable oxygen source to provide oxygen and apply a pressure gradient to a flow of the oxygen, an organ preservation system having an inlet to fluidly couple to vasculature of the tissue, and an oxygen line to fluidly couple the portable oxygen source to the organ preservation system at the inlet, wherein the portable oxygen source is to apply the pressure gradient to pump fluid containing the oxygen through the organ preservation system.

In an example, a method of preserving tissue can include pumping a perfusate as a mixture comprising oxygen into a perfusion system fluidly coupled to the vasculature, wherein pumping the mixture comprises both moving the mixture into the vasculature and regulating pressure of the mixture with a single device; and providing energy to effect the pumping using a portable oxygen source.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present disclosure describes, among other things, a perfusion system including a portable oxygen source. For the purposes of this disclosure, a "portable oxygen source" comprises a portable oxygen concentrator or portable oxygen generator, or any other portable device that operates to concentrate the atmosphere, or generate oxygen, so as to supply oxygen at a greater concentration than is available from the surrounding atmosphere. This definition excludes, for example, a traditional pressurized oxygen tank or a traditional air compressor, because neither concentrates nor generates oxygen so as to supply the oxygen at a greater concentration than is available from the surrounding atmosphere. The perfusion system can allow for simultaneous pumping of a perfusate fluid through tissue while oxygenating the perfusate fluid.

Once separated from a living body, organs, limbs and other vascularized tissues may be oxygenated, and metabolic waste products removed, to maintain viability of those tissues beyond the medically established cold ischemic time. Perfusion is a possible method to prolong organ viability outside the body. Perfusion systems can pump an oxygen-enriched liquid through the vasculature (e.g., arteries, capillaries, and veins) of tissue. Moreover, perfusion can deliver nutrient gas, such as oxygen, to metabolically active cells and simultaneously remove metabolic waste gas, such as carbon dioxide.

Conventional perfusion systems can use an electric pump to circulate the perfusate. By contrast, the perfusion systems and methods discussed herein can use compressed oxygen-rich gas from a portable oxygen source as both an oxygen supply and as an energy source to pump fluid through the vasculature. The coupling of perfusion device with an electrically powered portable oxygen source can allow the perfusion system to be simplified in design and manufactured free of electrical components such as batteries, motors, control circuits, etc., incorporated into the portable oxygen source. This configuration can also eliminate the need of dedicated pressure cycling valves.

The systems and methods discussed herein can utilize the inherent pulsatility of the oxygen supply from the portable oxygen source to provide perfusate in a pulsatile manner to the organ or tissue, which is more desirable than a constant supply because this delivery method more closely matches what is achieved using natural blood flow. Additionally, such perfusion systems with portable oxygen sources can be used during transport via commercial aviation, being generally safer and more readily accommodated by the industry than traditional, high-pressure oxygen tanks.

Figure 1:
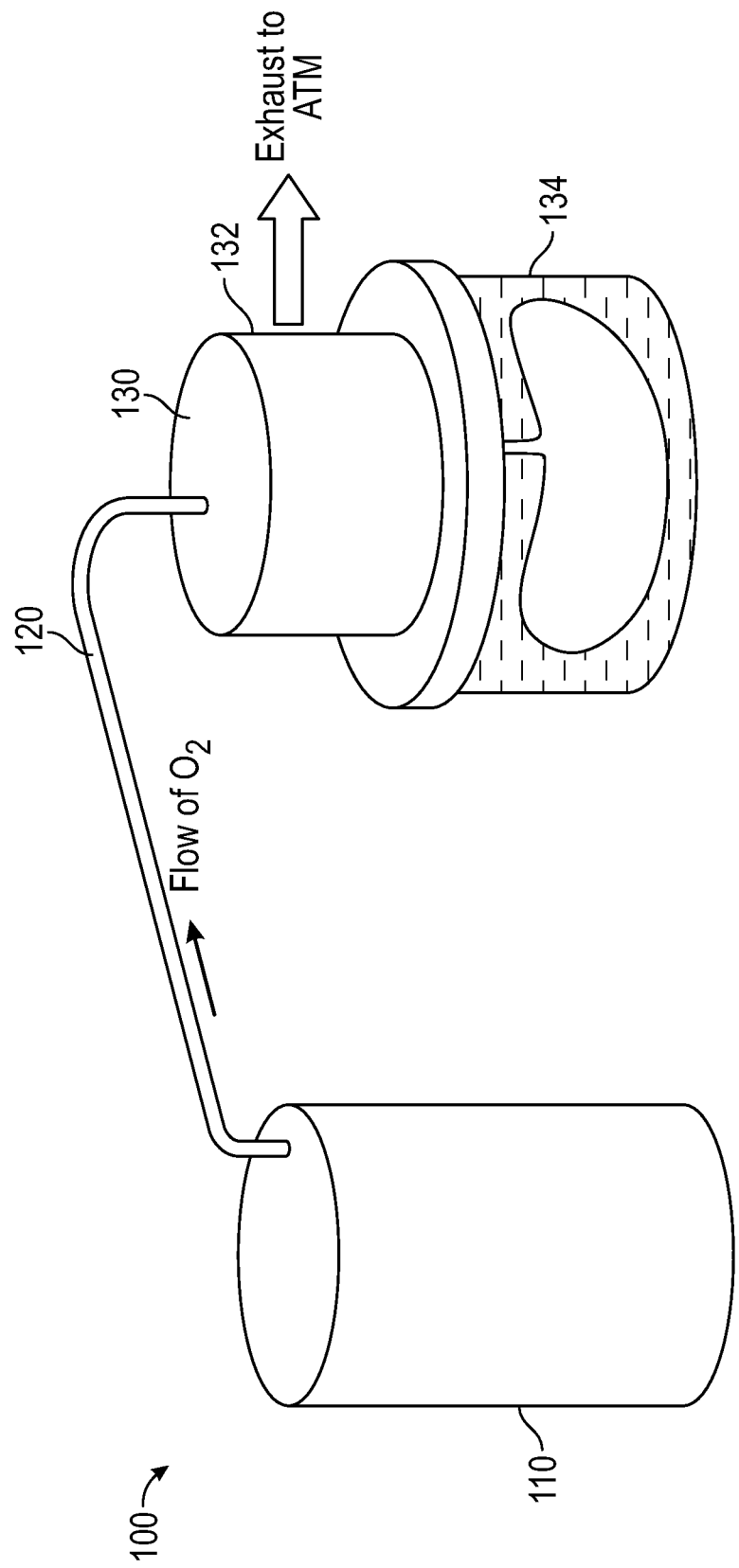
FIG. 1 illustrates a schematic figure of a perfusion system including a portable oxygen source.

FIG. 1 illustrates a schematic figure of a perfusion system 100 including a portable oxygen source 110. System 100 can include a portable oxygen source 110, a pressurized oxygen line 120, an organ preservation system 130 with an exhaust 132, and an organ container 134.

In perfusion system 100, the portable oxygen source 110 can be fluidly coupled to the organ preservation system 130 through the pressurized oxygen line 120. The portable oxygen source 110 can be linked to the organ preservation system 130 such that gas provided by the portable oxygen source 110 flows through the tissue, organ, or limb, in the organ preservation system 130.

The portable oxygen source 110 can be a portable oxygen concentrator or a portable oxygen generator. In either case, the portable oxygen source 110 can provide oxygen to the organ preservation system 130 and provide a pressure gradient to the system 100 to induce flow of a perfusate fluid therethrough.

For example, an oxygen concentrator can be a compact, small, quiet, and lightweight source of oxygen. Such an oxygen concentrator can filter surrounding air, compress that air to a specified density, and deliver purified oxygen in a pulsatile fashion, or in a continuous stream. Such an oxygen concentrator can be fitted with filters and/or sieve beds to remove nitrogen and other elements, gases, or contaminants from the air.

In an example, the portable oxygen source 110 can be an oxygen concentrator including a pressure swing adsorption system, such as the Invacare® Platinum Mobile oxygen concentrator (Invacare Corporation, Elyria, OH).

A pressure swing adsorption oxygen concentrator can leverage a molecular sieve to absorb gases and operate using rapid pressure swing adsorption to capture atmospheric nitrogen in minerals, such as zeolite, and subsequently vent that nitrogen, operating in a manner that is similar to a nitrogen scrubber. This can allow other atmospheric gases to exit the system, leaving oxygen as the primary remaining gas.

Conventional oxygen concentrators can include an air compressor, the molecular sieve or alternatively a membrane, a pressure equalizer, and various valves and tubes to accomplish these functions. Other types or configurations of oxygen concentrators or oxygen sources are also envisioned herein.

In some cases, the portable oxygen source can be an oxygen generator. In this context, an oxygen generator produces molecular oxygen ($O_2$ gas) by reaction of other chemical components. Examples of oxygen-generating chemical reactions can include thermal decomposition of chlorate or perchlorate salts, electrolysis of potassium superoxide, enzyme (catalase)-mediated decomposition of hydrogen peroxide, electrolysis of water, or other appropriate reactions. Example reactions are shown below. Other appropriate reactions for the production of molecular oxygen are also envisioned.

$$2NaClO_3 \rightarrow 2NaCl + 3O_2$$

$$2KO_2 + 2H_2O \rightarrow 2KOH + H_2O_2 + O_2$$

$$2H_2O_2 \rightarrow 2H_2O + O_2$$

$$2H_2O \rightarrow 2H_2 + O_2$$

The portable oxygen source 110 can produce oxygen at a rate of about 1 to 20 liters per minute. The portable oxygen source 110 can provide gaseous oxygen to the system 100, or provide dissolved oxygen situated in a liquid. The portable oxygen system 110 can operate in a continuous flow mode, or in a pulsed output mode. In a continuous flow mode, oxygen may be supplied at a steady flow rate, independent of any input signal. In a pulsed output mode, oxygen may be supplied on demand, as prompted by an input signal.

The pressurized oxygen line 120 can include tubing, piping, or some other fluid-tight passageway between the portable oxygen source 110 and the organ preservation system 130. The pressurized oxygen line 120 can allow for transfer of oxygen provided by the portable oxygen source 110 to the tissue, organ, or limb in the organ preservation system 130.

The organ preservation system 130 can include, for example, one or more connections to the portable oxygen source 110, the organ container 134 itself, and/or a perfusion circuit connecting a source of perfusate fluid to the organ container 134, in addition to the exhaust port 132. In the organ preservation system 130, a perfusate fluid is delivered to the organ, tissue, or limb, hooked into the organ container 134.

The perfusate fluid can be a perfusate, blood, saline, fluid specifically formulated for organ preservation or perfusion, or some other appropriate fluid for perfusion of an organ or target tissue in the container 134. The fluid can be, for example, oxygen-enriched fluid or blood-based fluid, to provide oxygen to the target tissue, organ, or limb. For example, the organ can be a heart, lung, kidney, or other vascular tissue requiring oxygenation while outside the body. The perfusion circuit can include, for example, tubing, piping, or hosing, to carry the perfusate fluid between one or more fluid reservoirs, and the organ container 134.

The portable oxygen source 110 can be fluidly connected to the perfusion circuit via the pressurized oxygen line 120. Oxygen provided by the portable oxygen source 110 can be dissolved in or mixed with the perfusate fluid in the perfusate circuit upstream of the organ container 134 so that the perfusate fluid delivered to the organ, tissue, or limb, can provide additional oxygen. Used perfusate fluid can be cycled back through the organ preservation system 130, where more oxygen can be introduced to the depleted perfusate fluid before cycling the perfusate fluid back through the organ, limb, or tissue. Such a cycle can be seen in FIG. 3, described below.

Turning again to FIG. 1, it is understood that the portable oxygen source 110 can also power a pump to move the perfusate fluid through the perfusate circuit in the organ preservation system 130. The provision of oxygen by the portable oxygen source 110 can provide sufficient pressure and movement of gas through the pressurized oxygen line 120 to move the pump diaphragm of the organ preservation system 130, which in turn moves the perfusate fluid within the perfusate circuit of the organ preservation system 130. In this way, an external mechanical or electrical pump is not required to move the perfusate fluid within the system 100.

Figure 2:
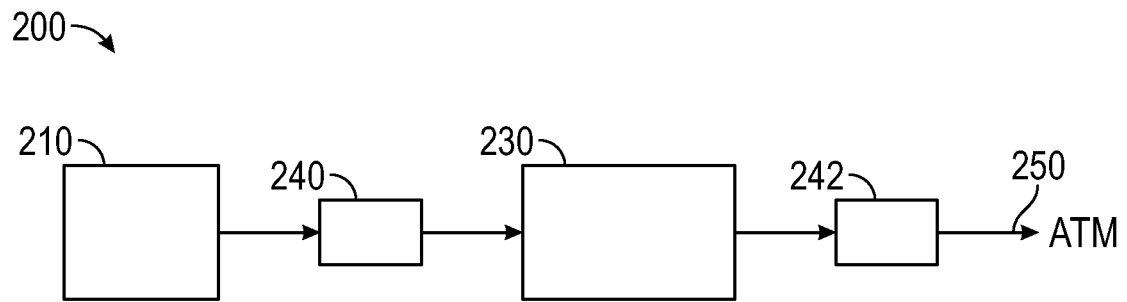
FIG. 2 illustrates a schematic figure of a perfusion system including a portable oxygen source in a second example.

FIG. 2 illustrates a schematic diagram of a perfusion system 200 including a portable oxygen source 210. The system can include a perfusion system 230, optional components 240, 242, and an outlet 250. Additional elements may be added in locations 240 and/or 242 with respect to the portable oxygen source 210 and the tissue preservation system 230, in any combination desired. System 200 can have similar or identical components to those of system 100 in FIG. 1, except where otherwise noted.

The optional elements 240, 242 can be in line with (i.e., fluidly coupled to) the organ preservation system 230. The elements 240, 242, can include components such as a gas-powered pump, a gas accumulator, an element that responds to a "breath" signal, a pressure regulator, a flow regulator, a filter, a humidifier, a gas injector, a liquid injector, a gas exchanger, an oxygenator, a heat exchanger, a gas separator, a fluid or gas pulse inducing element, a fluid or gas pulse modulating element, a dialysis system, a mechanism for adding nutrients, a mechanism for removing waste, a nutrient infusion system, a drug infusion system, on-board sensors, sampling ports, access points for ultrasonic flowmeters or oximeters, pressure relief valves, combinations thereof, or other suitable components.

The optional elements 240, 242 can include, for example, a gas-powered pump. Such a gas-powered pump could use some or all compressed gas output from the portable oxygen source 210 to pump liquid perfusate fluid within the organ preservation system 230. Such a gas-powered pump can be a diaphragm, piston, turbine, combinations thereof, or other suitable pumps.

The optional elements 240, 242 can include, for example, a gas accumulator. A gas accumulator can include a pressure storage reservoir for holding gas, such as oxygen, as desired. The stored oxygen can be used to help regulate the amount of oxygen flowing through the system 200.

The optional elements 240, 242 can include, for example, an element configured to monitor gas flow and send a "breath" signal (e.g., as is commonly received by and used to initiate a pulse of compressed gas from a portable oxygen concentrator) back to the portable oxygen source 210 if the system 200 is operating in a pulse mode. In this case, one or more of the optional elements 240, 242, can monitor the flow of oxygen and/or perfusate fluid through the system 200, and indicate the quantity or speed of that flow to the system. The function of the portable oxygen source 210, such as at what rate the portable oxygen source 210 produces oxygen, can be adjusted accordingly.

For example, pressure and flow regulators can be used as one of the elements 240, 242, in line with (i.e., fluidly coupled to) the target tissue compartment of the organ preservation system 230 to monitor and regulate the pressure of fluid flowing into, and out of the tissue. Monitoring and regulating pressure and flow of the perfusate fluid can affect, for example, how quickly and efficiently oxygen or nutrients from the perfusate fluid are distributed within the tissue.

A filter can be used leading into or out of the tissue container of the organ preservation system 230 as one of the elements 240, 242. The filter can include, for example, a particulate filter, a filter for removing contaminants in the perfusate fluid, a filter directed to chemicals or dissolved gases, or any other type of appropriate filter for treatment of the perfusate fluid. In any example of the portable oxygen source and perfusion system disclosed herein, multiple filters can be used. In some cases, a filter can be upstream of the tissue container of the organ preservation system 230 so as to filter the perfusate fluid prior to reaching the tissue or organ being perfused. In some cases, the filter can be downstream of the tissue container of the organ preservation system 230 so that fluid returning to the tissue container reservoir is filtered.

A humidifier, liquid injector, gas injector, gas exchanger, oxygenator, gas separator can be used as one of the elements 240, 242, to regulate the amount and types of water, liquid, and dissolved gases in the perfusate fluid flow. For example, a humidifier can provide an increased amount of water to the perfusate fluid as desired, depending on the perfusion needs for the tissue being treated. Similarly, liquid or gas injectors can be used to insert other fluids into the perfusate fluid, such as dissolved hydrogen, that may work with dissolved oxygen to provide better perfusion conditions for the tissue.

A heat exchanger or other temperature regulator as one of the elements 240, 242, can include, for example, heat absorption material in line with (i.e., fluidly coupled to) the perfusion circuit. In some cases, the heat exchanger can be a fin type or plate type heat exchanger. In some cases, the heat exchanger can be a cross-flow type heat exchanger. In any case, a heat exchanger can be used to reduce, increase, or regulate the temperature of the perfusate fluid prior to entering the tissue container 134 (as shown in FIG. 1), or as the perfusate fluid exits the tissue container 134, or both.

Turning back to FIG. 2, it can be seen that a pulse inducing element or a pulse modulating element as one of the elements 240, 242, can regulate the tempo at which the perfusate fluid runs towards the organ, tissue, or limb, and subsequently at what timing, pattern, and length of pulses the perfusate fluid is delivered to the tissue container. Such an element can impart a pulsatile character to the perfusate flow, analogous to physiologic blood flow, to simulate physiologic conditions. Such an element can be, for example, a mechanical element or regulator, such as a fluidic switch.

A dialysis system or mechanisms for removing waste as one or more of the elements 240, 242, can be integrated into the system 200 upstream or downstream of the tissue compartment of the organ preservation system 230. Such components can be configured to remove particular types of gaseous or liquid waste from the perfusate fluid stream, such as by using sorbents to process waste.

Mechanisms for adding nutrients, a nutrient infusion system, a drug infusion system, may operate as one or more of the elements 240, 242, and can also optionally be integrated with the systems 100, 200. These types of systems can allow for insertion of particular vitamins, minerals, and drugs, as desired, to treat the target tissue or organ.

On-board sensors, sampling ports, and/or access points as one or more of the elements 240, 242 can be integrated into the pressurized oxygen line or the perfusion circuit of the systems 100, 200 to allow for monitoring of pressure, temperature, fluid content, flow rate, and other parameters. Sensors can include sensors for pressure, flow rate, temperature, concentration or partial pressure of oxygen, concentration or partial pressure of carbon dioxide concentration, pH, electrolytes such as potassium or sodium, or other biochemical sensors such as for glucose, lactate, or other sugar. As desired, pressure relief valves can be integrated into the perfusion circuit to allow for tailoring of pressure within the circuit during operation.

Any of these components can be situated at, on, or in the inlet of the tissue compartment 240 to affect the perfusate fluid entering the tissue; and at, on, or in the outlet of the target tissue compartment 240 to affect the perfusate fluid exiting the tissue prior to cycling back to a reservoir, or both. Alternatively, any of these components can be situated on or fluidly coupled to the pressurized oxygen line 220 to monitor or regulate the oxygen provided by the portable oxygen source 210 and delivered to the organ preservation system 230.

Figure 3:
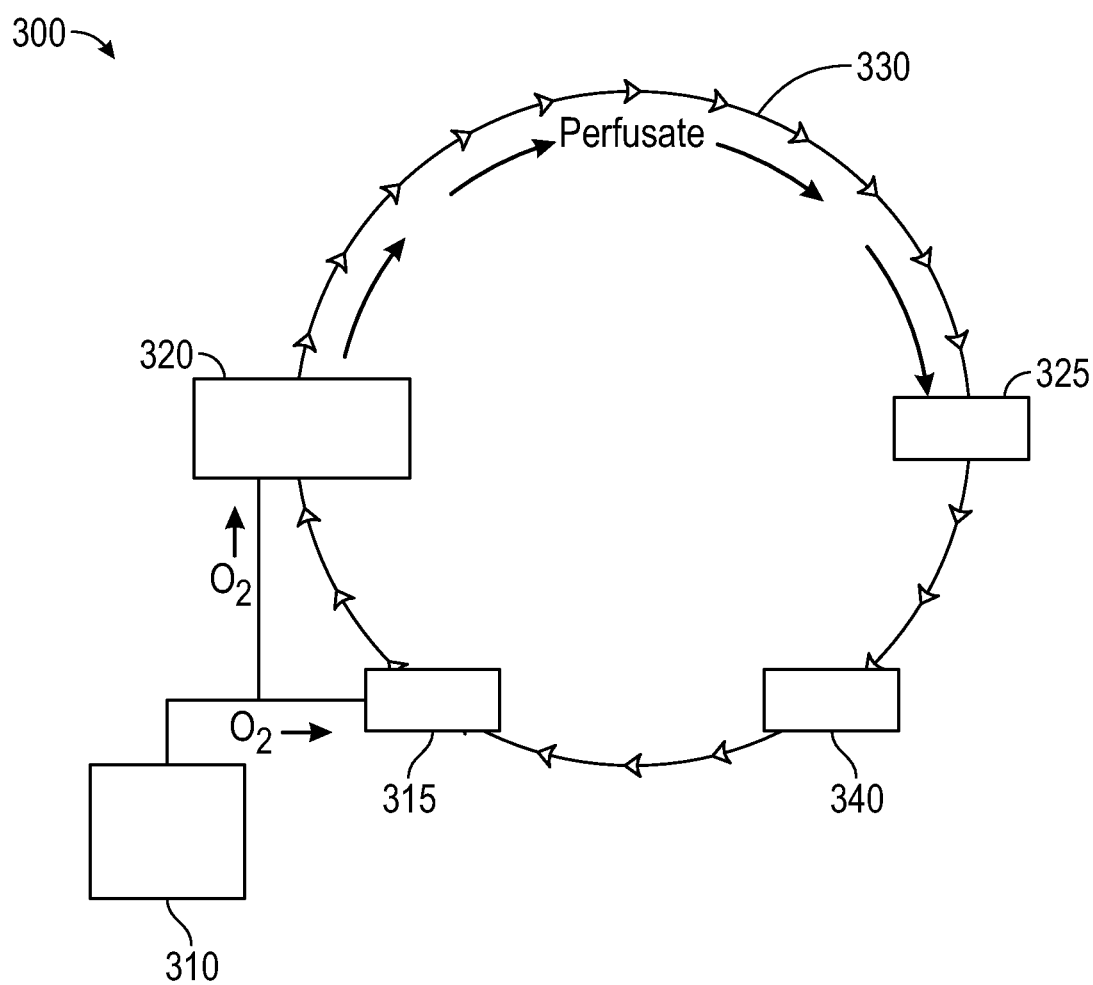
FIG. 3 illustrates a schematic figure of a perfusion system including a portable oxygen source in a third example.

FIG. 3 illustrates a schematic diagram of a perfusion system 300 including a portable oxygen source 310 in a third example. System 300 can include a portable oxygen source 310, a pump 315, a gas exchanger 320, a filter 325, and a tissue container 340. The components of system 300 can be similar to or identical to those of system 100 discussed above. In system 300, a liquid phase perfusate may flow through the tissue in the tissue container 340 in a continuous circuit. The flow of perfusate fluid and oxygen can thus continue around the circuit, to exit from, and return to the tissue container 340.

In system 300, the portable oxygen source 310 can drive the supply and pumping of oxygen to the gas exchanger 320. The gas exchanger 320 can add oxygen to the perfusate fluid, which can be filtered by the filter 325, prior to entering the tissue container 340, where the organ, tissue, or limb being perfused can be oxygenated. The flow of perfusate fluid through the organ may be in the antegrade or retrograde direction. In system 300, one possible direction of flow is indicated by the arrows.

Figure 4:
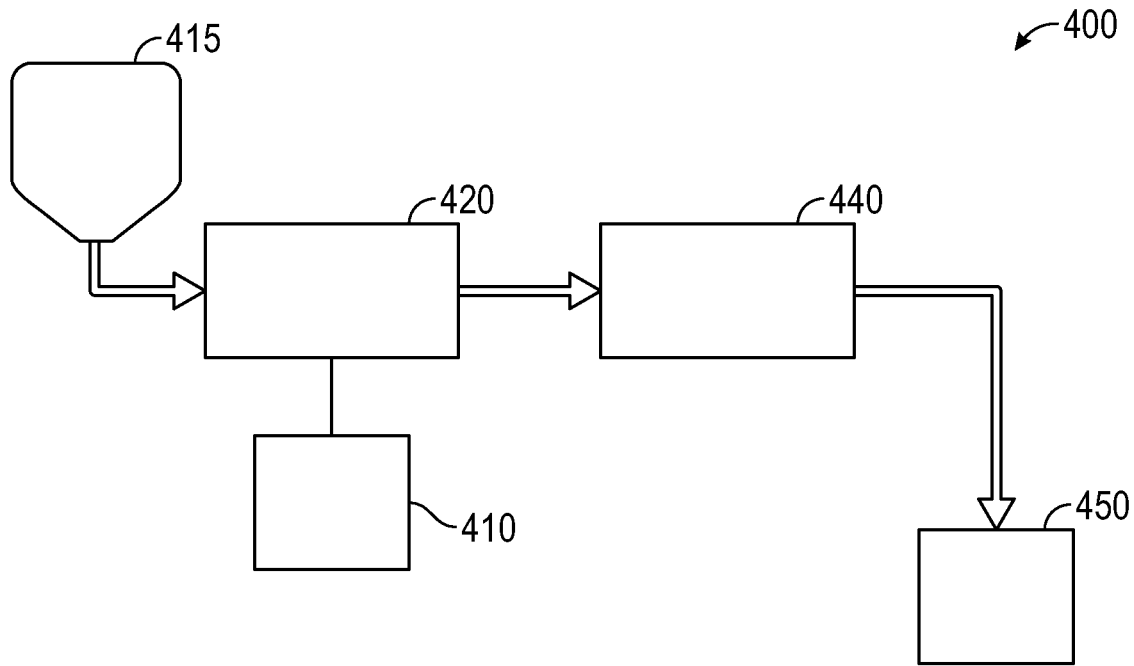
FIG. 4 illustrates a schematic figure of a perfusion system including a portable oxygen source in a fourth example.

FIG. 4 illustrates a schematic diagram of a perfusion system 400 including a portable oxygen source 410 in a third example. System 400 can include a portable oxygen source 410, a liquid perfusate reservoir 415, a pump and gas exchange element 420, a tissue container 440, and a waste container 450. The components of system 400 can be similar to or identical to those of system 100 discussed above. In system 400, a liquid phase perfusate may flow through the tissue in the tissue container 440, perhaps taking a single pass through the organ before being collected as waste. Thus, the circuit in FIG. 4 is an open circuit, and not a closed, recirculating circuit, as was described with respect to the example shown in FIG. 3. Therefore, in the case of FIG. 4, the perfusate fluid is continuously fresh.

Figure 5:
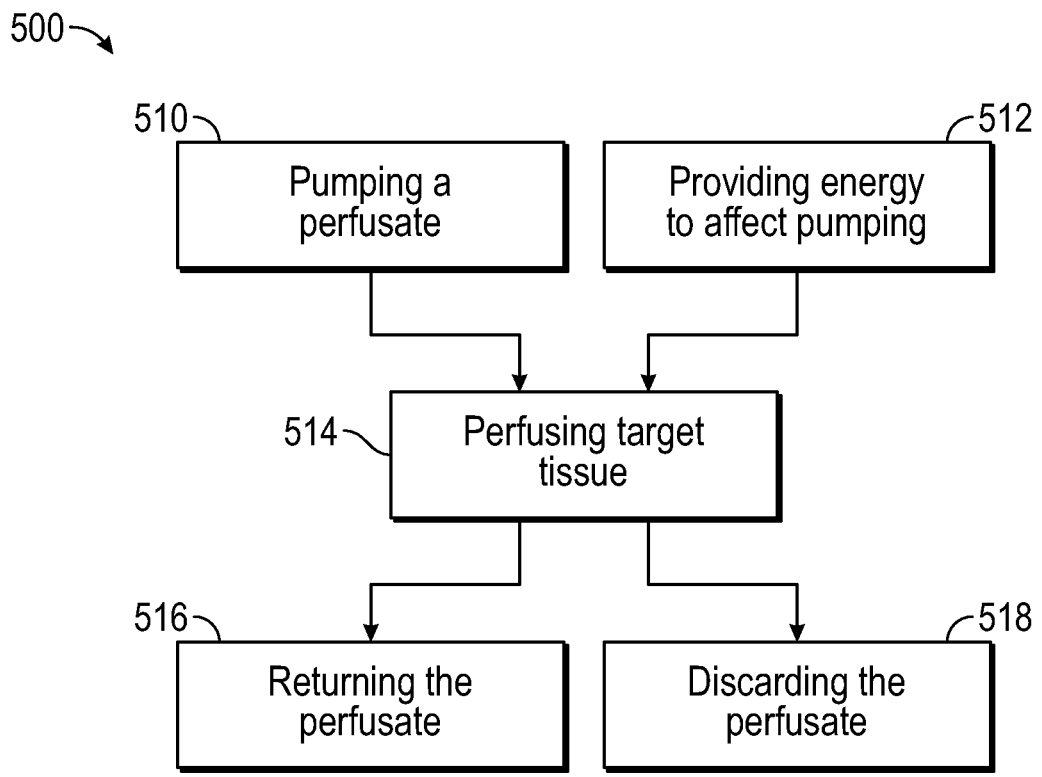
FIG. 5 illustrates a flow chart of a method of applying oxygen to a perfusion system.

FIG. 5 illustrates a flow chart of a method 500 of applying oxygen to a perfusion system. The method 500 can include pumping a perfusate as a mixture comprising oxygen into a perfusion system fluidly coupled to vasculature in tissue (block 510) and providing energy to pump the mixture using a portable oxygen source (block 512). These actions can be accomplished substantially simultaneously.

In block 510, pumping the mixture can include moving the mixture into the vasculature of the tissue and regulating pressure of the mixture with a single device, such as an integrated pump. The pumping can be performed continuously or in a pulsatile fashion. If a pulsatile fashion is used, a fluidic oscillator can be used to apply a desired pumping cycle. The cycle can be determined, in part, by feedback pressure derived from the perfusion system. This can be done substantially simultaneously with block 512, to provide the energy to affect pumping. Subsequently, the organ or tissue can be perfused in block 514.

After perfusion, the perfusate can be returned for later a use, or discarded. In block 516, the perfusate can be returned a reservoir or other chamber for further pumping and/or oxygenation, or discarded at block 518. These activities may describe the operation of the systems shown in FIGS. 3 and 4.

Various Notes & Examples

Each of these non-limiting examples can stand on its own, or can be combined in various permutations or combinations with one or more of the other examples.

Example 1 can include a system to preserve tissue. The system can include a portable oxygen source to provide oxygen and apply a pressure gradient to a flow of the oxygen, an organ preservation system having an inlet to fluidly couple to vasculature of the tissue, and an oxygen line to fluidly couple the portable oxygen source to the organ preservation system at the inlet, wherein the portable oxygen source is to apply the pressure gradient to pump fluid containing the oxygen through the organ preservation system.

Example 2 can include Example 1, wherein the portable oxygen source comprises an oxygen concentrator.

Example 3 can include any of Examples 1-2, wherein the portable oxygen source comprises an oxygen generator.

Example 4 can include any of Examples 1-3, wherein the portable oxygen source is configured to provide gaseous oxygen to the organ preservation system.

Example 5 can include any of Examples 1-4, wherein the portable oxygen source is to provide energy to pump dissolved oxygen in a liquid to the organ preservation system.

Example 6 can include any of Examples 1-5, wherein the portable oxygen source is configured to pump the fluid in a pulsed output mode.

Example 7 can include any of Examples 1-6, wherein the portable oxygen source is to pump the fluid in a continuous output mode.

Example 8 can include any of Examples 1-7, wherein the portable oxygen source comprises a pressure swing adsorption system.

Example 9 can include any of Examples 1-8, wherein the portable oxygen source is to oxygenate and pump the fluid in response to a chemical reaction operating within the portable oxygen source.

Example 10 can include any of Examples 1-9, further comprising a gas-powered pump to receive compressed gas comprising the oxygen, the compressed gas to induce pumping of the fluid through the organ preservation system.

Example 11 can include any of Examples 1-10, wherein the gas-powered pump comprises a diaphragm, a piston, a fan, a turbine, or combinations thereof.

Example 12 can include any of Examples 1-11, further comprising one or more pressure regulators to fluidly couple to the oxygen line.

Example 13 can include any of Examples 1-12, further comprising one or more flow regulators to fluidly couple to the oxygen line.

Example 14 can include any of Examples 1-13, further comprising one or more filters to fluidly couple to the oxygen line.

Example 15 can include any of Examples 1-14, further comprising a humidifier to fluidly couple to the oxygen line.

Example 16 can include any of Examples 1-15, further comprising a liquid injector to fluidly couple to the oxygen line.

Example 17 can include any of Examples 1-16, further comprising a gas exchanger to fluidly couple to the oxygen line.

Example 18 can include any of Examples 1-17, further comprising a heat exchanger to regulate temperature of the fluid.

Example 19 can include any of Examples 1-18, further comprising a gas accumulator for receiving and accumulating gas exiting an outlet of the organ preservation system.

Example 20 can include any of Examples 1-19, further comprising one or more pulse inducing or pulse modulating elements to impart a pulsatile character to the perfusate flow.

Example 21 can include any of Examples 1-20, further comprising a dialysis system fluidly coupled to the organ preservation system, the dialysis system to add nutrients or to remove waste from the fluid.

Example 22 can include any of Examples 1-21, further comprising an infusion system coupled to the oxygen line, the infusion system to infuse the fluid with one or more nutrients or drugs.

Example 23 can include any of Examples 1-22, further comprising one or more sampling ports in system.

Example 24 can include any of Examples 1-23, further comprising one or more pressure relief valves in the system.

Example 25 can include any of Examples 1-24, wherein the fluid comprises a n organ preservation fluid or an organ machine perfusion fluid.

Example 26 can include any of Examples 1-25, wherein the fluid cycled through the system to remove waste generated by the tissue.

Example 27 can include any of Examples 1-26, wherein the perfusion system further comprises one or more vents to release waste gas into an atmosphere surrounding the perfusion system.

Example 28 can include any of Examples 1-27, further comprising a pump to couple to the portable oxygen source.

Example 29 can include a method of preserving tissue comprising vasculature can include pumping a perfusate as a mixture comprising oxygen into a perfusion system fluidly coupled to the vasculature, wherein pumping the mixture comprises both moving the mixture into the vasculature and regulating pressure of the mixture with a single device; and providing energy to effect the pumping using a portable oxygen source.

Example 30 can include Example 29, wherein the pumping is performed continuously.

Example 31 can include any of Examples 29-30, wherein the pumping is performed in a pulsatile fashion.

Example 32 can include any of Examples 29-31, wherein the pulsatile fashion of pumping is accomplished using a fluidic oscillator having a cycle determined by feedback pressure derived from the perfusion system.

In Example 33, the systems or methods of any one or any combination of Examples 1-32 can optionally be configured such that all elements or options recited are available to use or select from.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usage between this document and any documents incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system to preserve tissue, the system comprising:
a portable oxygen source configured to simultaneously provide oxygen and to apply a pressure gradient to a flow of the oxygen;
an organ preservation system for housing the tissue, having an inlet fluidly coupled to vasculature of the tissue;
an oxygen line to fluidly couple the portable oxygen source to the organ preservation system at the inlet and perfuse a fluid with the oxygen; and
a compressed gas-powered pump coupled to the portable oxygen source that provides compressed oxygen to the compressed gas-powered pump to pump the fluid containing the oxygen to the organ preservation system.

2. The system of claim 1, wherein the portable oxygen source comprises an oxygen concentrator.

3. The system of claim 1, wherein the portable oxygen source comprises an oxygen generator.

4. The system of claim 1, wherein the portable oxygen source is configured to pump the fluid in a pulsed output mode.

5. The system of claim 1, wherein the portable oxygen source is configured to pump the fluid in a continuous output mode.

6. The system of claim 1, wherein the portable oxygen source comprises a pressure swing adsorption system.

7. The system of claim 1, wherein the portable oxygen source is configured to generate and compress oxygen in response to a chemical reaction operating within the portable oxygen source.

8. The system of claim 1, further comprising a gas-powered pump configured to receive compressed gas comprising the oxygen, the compressed gas to induce pumping of the fluid through the organ preservation system.

9. The system of claim 8, wherein the gas-powered pump comprises a diaphragm, a piston, a fan, a turbine, or combinations thereof.

10. The system of claim 1, further comprising one or more pressure regulators to fluidly couple to the oxygen line.

11. The system of claim 1, further comprising one or more flow regulators to fluidly couple to the oxygen line.

12. The system of claim 1, further comprising a gas accumulator for receiving and accumulating gas exiting an outlet of the organ preservation system.

13. The system of claim 1, further comprising one or more pulse inducing or pulse modulating elements to impart a pulsatile character to the perfusate flow.

14. The system of claim 1, wherein the perfusion system further comprises one or more vents to release waste gas into an atmosphere surrounding the perfusion system.

15. A system to preserve tissue having vasculature, the system comprising:

an organ preservation system configured to house the tissue, and having an inlet fluidly coupled to vasculature of the tissue;

a compressed gas-powered pump coupled to the inlet to pump a perfusate to the organ preservation system; and a portable oxygen source coupled to provide oxygen to the perfusate and coupled to the compressed gas-powered pump to provide compressed oxygen to the compressed gas-powered pump to apply a pressure gradient to pump the perfusate containing oxygen to the organ preservation system.

16. The system of claim 15, wherein the portable oxygen source comprises an oxygen concentrator.

17. The system of claim 15, wherein the portable oxygen source comprises an oxygen generator.

18. The system of claim 15, wherein the gas-powered pump comprises a diaphragm, a piston, a fan, a turbine, or combinations thereof.

19. The system of claim 15, further comprising one or more pressure regulators to fluidly couple to the portable oxygen source.

* * * * *